United States Patent
Bailey et al.

(10) Patent No.: US 10,333,619 B2
(45) Date of Patent: Jun. 25, 2019

(54) OPTICAL POSITIONING

(71) Applicant: Nokia Technologies Oy, Espoo (FI)

(72) Inventors: Marc Bailey, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/531,522

(22) PCT Filed: Dec. 12, 2014

(86) PCT No.: PCT/FI2014/050991
§ 371 (c)(1),
(2) Date: May 30, 2017

(87) PCT Pub. No.: WO2016/092146
PCT Pub. Date: Jun. 16, 2016

(65) Prior Publication Data
US 2018/0234179 A1    Aug. 16, 2018

(51) Int. Cl.
| | |
|---|---|
| *H04B 10/114* | (2013.01) |
| *G01S 7/481* | (2006.01) |
| *G01S 17/02* | (2006.01) |
| *G01S 17/42* | (2006.01) |
| *G01S 17/08* | (2006.01) |
| *G01S 17/48* | (2006.01) |

(52) U.S. Cl.
CPC .......... *H04B 10/114* (2013.01); *G01S 7/4815* (2013.01); *G01S 7/4817* (2013.01); *G01S 17/023* (2013.01); *G01S 17/08* (2013.01); *G01S 17/42* (2013.01); *G01S 17/48* (2013.01)

(58) Field of Classification Search
CPC ..... H04B 10/114; G01S 17/42; G01S 7/4817; G01S 7/4815; G01S 17/08; G01S 17/023; G01S 17/48
See application file for complete search history.

(56) References Cited

U.S. PATENT DOCUMENTS

| | | |
|---|---|---|
| 5,949,371 A | 9/1999 | Nichols |
| 6,108,076 A | 8/2000 | Hanseder |
| 7,502,688 B2 | 3/2009 | Hirokawa |
| (Continued) | | |

FOREIGN PATENT DOCUMENTS

| | | |
|---|---|---|
| EP | 238615 A1 | 9/1987 |
| EP | 1962162 A2 | 8/2008 |
| (Continued) | | |

OTHER PUBLICATIONS

Kuo et al., "Luxapose: Indoor Positioning With Mobile Phones and Visible Light", Proceedings of the 20th annual International conference on Mobile computing and networking, Sep. 7-11, 2014, pp. 447-458.

(Continued)

*Primary Examiner* — Leslie C Pascal
(74) *Attorney, Agent, or Firm* — Mintz Levin Cohn Ferris Glovsky and Popeo, P.C.

(57) ABSTRACT

According to an example aspect of the present invention, there is provided an apparatus comprising at least one memory configured to store positioning information, and at least one processing core configured to determine a position estimate for the apparatus based at least in part on the positioning information and on at least one direction of a steerable optical beam, the steerable optical beam being steerable by the apparatus.

16 Claims, 7 Drawing Sheets

(56) References Cited

U.S. PATENT DOCUMENTS

| | | | |
|---|---|---|---|
| 7,720,554 B2* | 5/2010 | DiBernardo | G01S 5/163 |
| | | | 356/139.03 |
| 8,174,931 B2 | 5/2012 | Vartanian et al. | |
| 8,364,334 B2 | 1/2013 | Au et al. | |
| 8,752,761 B2 | 6/2014 | Calvaresse et al. | |
| 2004/0137898 A1* | 7/2004 | Crandall, Jr. | G07C 9/00007 |
| | | | 455/426.2 |
| 2009/0262974 A1 | 10/2009 | Lithopoulos | |
| 2012/0008136 A1 | 1/2012 | Jaeger et al. | |
| 2012/0176491 A1 | 7/2012 | Garin et al. | |
| 2013/0345968 A1* | 12/2013 | Hartman | G01S 17/023 |
| | | | 701/446 |
| 2014/0225771 A1 | 8/2014 | Phuyal et al. | |

FOREIGN PATENT DOCUMENTS

| | | |
|---|---|---|
| WO | 2008/118578 A3 | 10/2008 |
| WO | 2012/081995 A1 | 6/2012 |
| WO | 2013/028359 A1 | 2/2013 |
| WO | 2013/096222 A1 | 6/2013 |
| WO | 2014/128507 A2 | 8/2014 |
| WO | 2014/155149 A1 | 10/2014 |

OTHER PUBLICATIONS

Mautz, "Indoor Positioning Technologies", Thesis, Feb. 2012, 128 pages.

International Search Report and Written Opinion received for corresponding Patent Cooperation Treaty Application No. PCT/FI2014/050991, dated Jun. 4, 2015, 13 pages.

\* cited by examiner

OPTICAL POSITIONING

RELATED APPLICATION

This application was originally filed as PCT Application No. PCT/FI2014/050991 filed Dec. 12, 2014.

FIELD OF INVENTION

The present invention relates to the field of optically augmented positioning.

BACKGROUND OF INVENTION

Determining a position may be accomplished in a variety of ways. Printed paper maps, information bulletin boards or signposts may be used to inform people of their whereabouts. Electronic devices may determine estimates of their locations by leveraging information that is available to them.

Electronic devices may determine estimates of their locations by receiving signals from positioning satellites, such as those comprised in the global positioning system, GPS, or GALILEO satellite constellations. Some devices are configured to use signals from satellites comprised in more than one such constellation to increase the accuracy of the estimated location compared to devices using satellites from only one constellation. Depending on the use case, locations may be determined with an accuracy of a few meters using satellite positioning.

Cellular communication devices may determine location estimates from an identity of a cell to which the cellular communication device is attached. Each cell may be configured with a cell identifier, which can be mapped to a location. The accuracy of this positioning method is dependent on the cell size and can vary from an accuracy of a few dozen meters to an accuracy of a few kilometers for larger cells.

Triangulation is a technique to determine a location based on receiving a plurality of signals and calculating their directions of arrival, DoA. Triangulation may result in a highly accurate position estimate in case the signals used are of a high quality. In some cases, a cellular communication device may triangulate its location using transmissions from a plurality of base stations. In such cases, triangulation may be employed in addition to, or alternatively to, using a cell identifier.

Consumer devices have in the past been furnished with pico projectors that may be used to project information from the device, such as a tablet device or cellular phone, to a wall. Pico projectors may be used to aid presentations given while travelling, for example on business trips when a separate, dedicated projector device is unavailable for use. For example in the year 2011, approximately 11 million pico projectors were sold to consumers comprised in mobile devices.

SUMMARY OF THE INVENTION

The invention is defined by the features of the independent claims. Some specific embodiments are defined in the dependent claims.

According to a first aspect of the present invention, there is provided an apparatus comprising at least one memory configured to store positioning information, and at least one processing core configured to determine a position estimate for the apparatus based at least in part on the positioning information and on at least one direction of a steerable optical beam, the steerable optical beam being steerable by the apparatus.

Various embodiments of the first aspect may comprise at least one feature from the following bulleted list:

- the apparatus comprises a steering mechanism arranged to steer the steerable optical beam
- the steering mechanism comprises an adjustable mirror
- the steerable optical beam comprises a steerable laser beam
- the at least one processing core is configured to cause the steerable optical beam to be directed toward a first reference target to determine, at least in part, the at least one direction
- the at least one processing core is configured to determine the position estimate based at least in part on two angles comprised in a first direction of the steerable optical beam to the first reference target, a time of flight between the apparatus and the first reference target, and an orientation of the apparatus
- the at least one processing core is configured to determine the position estimate based at least in part on a first direction of the steerable optical beam to the first reference target and a second direction of the steerable optical beam to a second reference target, the first and second directions being comprised in the at least one direction
- the at least one processing core is configured to determine the position estimate based at least in part on a first direction of the steerable optical beam to the first reference target, a second direction of the steerable optical beam to a second reference target and a third direction of the steerable optical beam to a third reference target, the first, second and third directions being comprised in the at least one direction
- the at least one processing core is configured to determine the position estimate based at least in part on a first direction of the steerable optical beam to a first reference target and a second direction of the steerable optical beam to a second reference target, the first direction being determined at a time instant when the second direction cannot be determined, and on information concerning movement of the apparatus after the time instant and before determining the second direction
- the at least one processing core is configured to determine the position estimate based at least in part on a first direction of the steerable optical beam to a first reference target and a second direction of the steerable optical beam to the first reference target, the first direction being determined at a first time instant and the second direction at a second time instant, and on information of movement of the apparatus between the first and second time instants
- the at least one processing core is configured to use the steerable optical beam to communicate with the first reference target in at least one of a high speed optical communication mode or a quantum communication mode
- the positioning information is based on at least one of a satellite positioning system, motion sensing, sensing of acceleration, radio triangulation and measurement of time
- the apparatus comprises or is comprised in a mobile telecommunication device.

According to a second aspect of the present invention, there is provided a method comprising storing positioning information, and determining a position estimate for an apparatus based at least in part on the positioning information and on at least one direction of a steerable optical beam, the steerable optical beam being steerable by the apparatus.

Various embodiments of the second aspect may comprise at least one feature corresponding to a feature from the preceding bulleted list laid out in connection with the first aspect.

According to a third aspect of the present invention, there is provided an apparatus comprising means for store positioning information, and means for determining a position estimate for an apparatus based at least in part on the positioning information and on at least one direction of a steerable optical beam, the steerable optical beam being steerable by the apparatus.

According to a fourth aspect of the present invention, there is provided a non-transitory computer readable medium having stored thereon a set of computer readable instructions that, when executed by at least one processor, cause an apparatus to at least store positioning information, and determine a position estimate for an apparatus based at least in part on the positioning information and on at least one direction of a steerable optical beam, the steerable optical beam being steerable by the apparatus.

According to a fifth aspect of the present invention, there is provided a computer program configured to cause a method in accordance with the second aspect to be performed.

INDUSTRIAL APPLICABILITY

At least some embodiments of the present invention find industrial application in increasing the accuracy of position estimates.

DETAILED DESCRIPTION OF EXAMPLE EMBODIMENTS

A steerable optical beam may be directed to a reference target to determine directional information that is usable, together with initial positioning information, to derive a more accurate position estimate. The reference target may comprise a retroreflector to enable pointing the steerable optical beam to the reference target.

Figure 1:
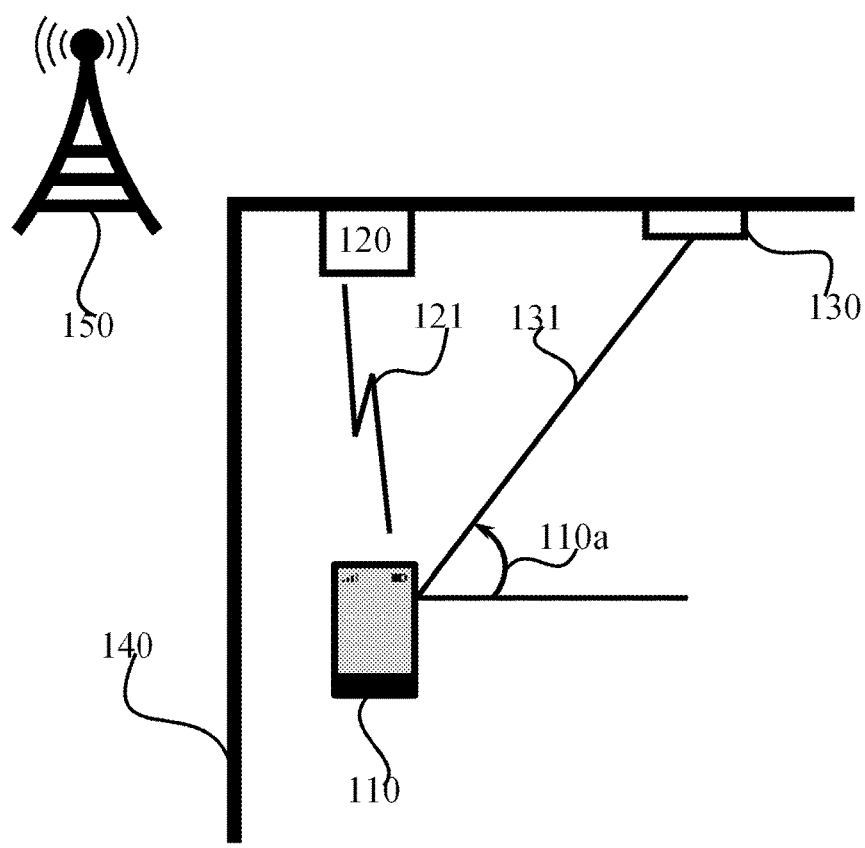
FIG. 1 illustrates an example system capable of supporting at least some embodiments of the present invention.

FIG. 1 illustrates an example system capable of supporting at least some embodiments of the present invention. The system of FIG. 1 comprises device 110, which may comprise, for example, a cellular telephone, smartphone, tablet computer, laptop computer or other suitable electronic device. In some embodiments, device 110 is an electronic shopping mall guide device. Device 110 is located inside a building, which is schematically illustrated as building 140. The walls of building 140 may attenuate wireless signals that originate from sources outside building 140, such as for example from base station 150.

Base station 150 may be configured to operate in accordance with at least one radio access technology, RAT. For example, base station 150 may be configured to operate in accordance with wideband code division multiple access, WCDMA, long term evolution, LTE, wireless local area network, WLAN, and/or IS-95 technology. Base station 150 may be configured to operate in accordance with a cellular and/or non-cellular RAT.

The network where base station 150 is comprised in may comprise further base stations, which however are not illustrated in FIG. 1 for the sake of clarity. Base station 150 is arranged to control a cell. A coverage area of the cell may be limited by attenuation the walls of building 140, to the extent that coverage indoors, inside building 140, may be poor.

A wireless communication capability of device 110 may be compatible with that of base station 150, in other words device 110 may be configured to support a same RAT as base station 150. Device 110 may then establish a radio link with base station 150 when device 110 is disposed inside the cell coverage area. The radio link may operate in accordance with code division multiple access, CDMA, time division multiple access, TDMA, orthogonal frequency division multiple access, OFDMA, or a combination thereof, for example. Device 110 may be configured to determine, based on a radio measurement, whether it is within the coverage area of the cell controlled by base station 150. For example, device 110 may measure the energy of a training sequence or reference symbols transmitted by base station 150.

In the system of FIG. 1, device 110 is in the coverage area of an indoor cell controlled by indoor base station 120. A radio link 121 connects device 110 to indoor base station 120, wherein radio link 121 may comprise a radio link in accordance with the RAT device 110 and indoor base station 120 both support. Radio link 121 may employ a RAT different from the one used by base station 150, for example. Device 110 may determine positioning information based on radio link 121, for example such positioning information may comprise an identity of indoor base station 120, or a cell indoor base station 120 controls.

Device 110 may store positioning information, the positioning information describing the location of device 110. For example, device 110 may store in a memory an identity of base station 150 or a cell controlled by base station 150, with which device 110 was associated before entering building 140. An identity of a base station or cell can serve as a rough estimate of location. Alternatively, or additionally, device 110 may store positioning information in the form of an identity of indoor base station 120, or an identity of an indoor cell of indoor base station 120. An indoor cell may be smaller than an outdoor cell, and thus provide a more accurate location estimate.

In some embodiments device 110 is statically configured with positioning information that is relevant in the location where device 110 is configured to be used. For example, where device 110 comprises an electronic shopping mall guide device, device 110 may lack an ability to communicate with base stations, such as base station 150 and indoor base station 120. Where device 110 comprises an electronic shopping mall guide device, it may be statically configured with positioning information that describes building 140, where the guide device is configured to be used. Another example is an airport guide device configured to guide passengers to the same gate. Such a device may be statically configured with positioning information concerning the airport where the device is configured to be used.

Device 110 may comprise a compass configured to determine an orientation of device 110 in terms of north, south, east and west. The compass may be configured to determine a magnetic north direction and to derive a true north from the magnetic north, optionally using in the determination information on a mapping between magnetic north and true north. Using the mapping between magnetic north and true north may comprise using a location-dependent magnetic declination, with device 110 storing internally or having access to a table of magnetic declination information. Device 110 may use the positioning information to select the correct magnetic declination value from the table. In general, position information to which an orientation of device 110 is added is also position information. In devices statically configured with positioning information, a magnetic declination concerning the area where the devices are configured to be used may be statically stored in the devices. Such statically configured magnetic declination may be comprised in the statically configured positioning information.

Device 110 may comprise an accelerometer configured to determine an orientation of device 110 with respect to the vertical. The accelerometer may interact with the Earth's gravitational field to determine the down direction with respect to a first axis and a second axis of device 110. Overall an orientation of device 110, which may be comprised in the positioning information, may this comprise orientation with respect to north and orientation with respect to the vertical.

Device 110 may further comprise a steerable optical beam generator. A steerable optical beam may comprise a laser beam or another kind of collimated beam of light. The beam may be in a visible wavelength, or it may be at least in part in an infra-red or ultra-violet wavelength. The beam may be a mixture of more than one wavelength. To generate a collimated beam, device 110 may comprise a collimator, the collimator comprising at least one of a curved mirror and a lens. Steering of the optical beam may be accomplished by a steering mechanism such as, for example, an adjustable mirror comprised in device 110, or actuators configured to steer components that generate the optical beam. Such actuators may comprise microelectromechanical, MEMS, actuators, for example. MEMS actuators may be used to adjust an adjustable mirror. An adjustable mirror may be adjustable in two degrees of freedom, for example. The steerable optical beam may be adjustable as to the level of collimation, for example device 110 may be enabled to cause the beam to become a divergent beam to illuminate a larger area. Divergence of the beam may be accomplished, for example, by a movable lens that may be caused to move closer to, and further from, a light source.

Reference target 130 may be affixed to a wall, roof or other structure inside building 140. Reference target 130 may comprise a retroreflector that is arranged to reflect light arriving in reference target 130 back toward the source of the light. A retroreflector may comprise, for example, a corner retroreflector or a cat's eye retroreflector. Device 110 may store in a memory information concerning at least one reference target that is present in building 140. In general, device 110 may be provided such information by indoor base station 120, via radio link 121, or such information may be statically configured in device 110. Such information may comprise information concerning one or more reference targets. Such information may comprise information on reference target location and/or orientation, for example.

To determine a position estimate of device 110, device 110 or a control device of device 110 may use the positioning information and reference target 130. For example, device 110 may cause the steerable optical beam to become divergent to illuminate a wall of building 140, and by using a photodetector comprised in device 110, determine a direction on the wall where a retroreflection of the optical beam originated from. Device 110 may then cause the steerable optical beam to become collimated, and directed at reference target 130 based on the direction. If the photodetector continues to detect a reflected beam when the steerable optical beam is collimated, the steerable beam points at the reference target. Device 110 may determine the direction to the reference target in other ways as well, for example by moving a collimated optical beam in a scanning pattern across a wall until the photodetector detects a retroreflection of the optical beam, indicating the direction to the reference target has been found.

Once the direction to reference target 130 is determined, for example by illuminating reference target 130 with the steerable optical beam 131, device 110 may extract the direction relative to device 110 from the steering mechanism of the steerable optical beam. The direction may be expressed as two angles, which are presented in FIG. 1 as direction 110a. To measure the distance between device 110 and reference target 130, device 110 may emit a pulse of light, or begin a continuous emission of light, and measure the time of flight to reference target 130 by measuring the time it takes for the retroreflected light to register at the photodetector, to establish the distance to reference target 130.

Once device 110 knows its orientation relative to north and to the vertical, the distance to reference target 130 and the two angles comprised in the direction to reference target 130, it may compute its position estimate, the position estimate providing a more accurate location than the original positioning information. For example, device 110 may use knowledge of the position of reference target 130, after which the position estimate of device 110 becomes solvable using the direction to reference target 130 and the orientation of device 110. Device 110 may additionally or alternatively derive a position estimate of its location relative to a floor plan of building 140 by using the direction and distance to reference target 130, and the orientation of device 110 relative to the vertical. An indication of a determined position estimate may be presented to a user of device 110, for example on a display screen.

In all, six degrees of freedom may be fixed: two from the angles comprised in the direction to reference target 130, one from the distance to the reference target, two from the orientation of device 110 relative to the vertical, and finally one from the orientation of device 110 relative to north.

Figure 2:
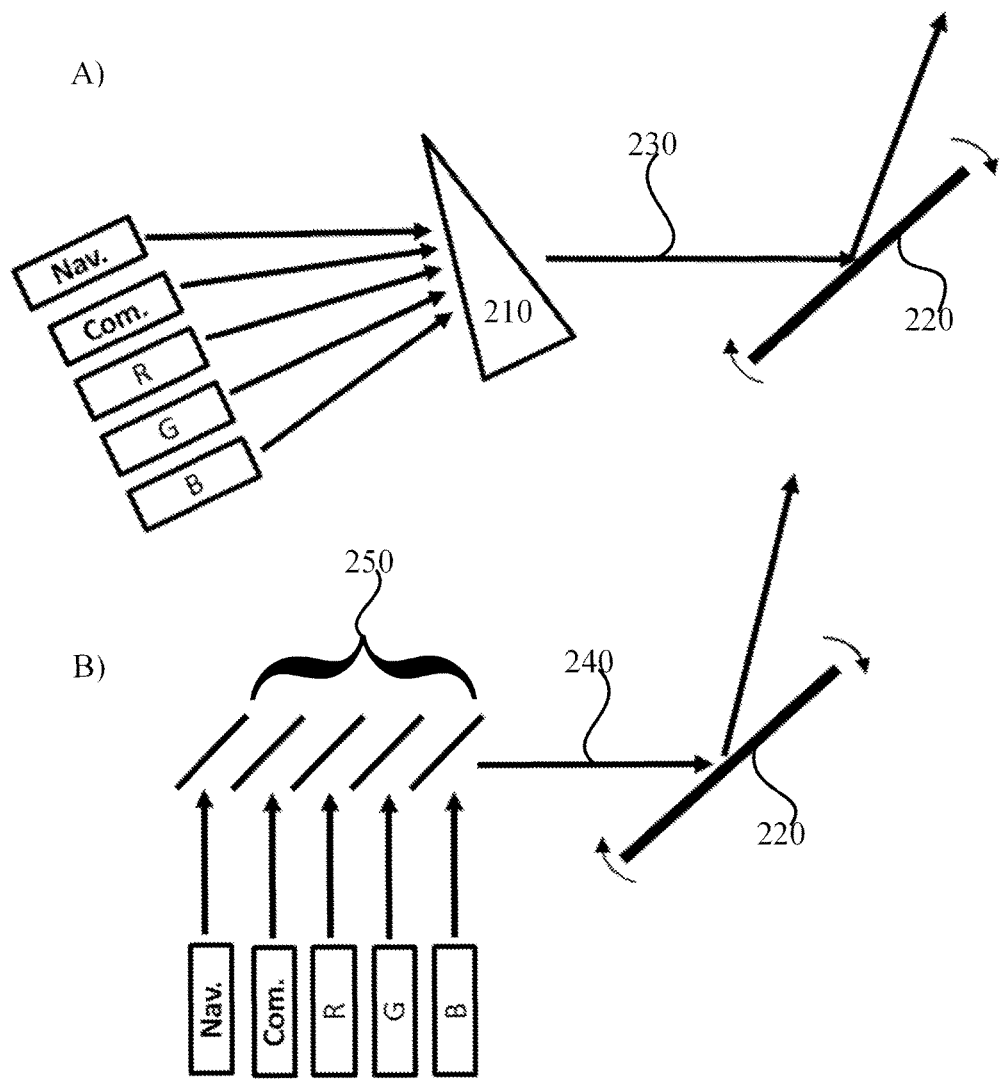
FIG. 2 illustrates example architectures of steerable optical beam generators.

FIG. 2 illustrates example architectures of steerable optical beam generators. FIG. 2 comprises two alternative embodiments concerning the steerable optical beam. In the upper half, denoted as A), a dispersive element 210 receives light components and emits a single beam 230. A dispersive element may comprise, for example, a prism. Steerable mirror 220 provides a capability to select a direction into which beam 230 is directed. Steerable mirror may be steered in two degrees of freedom, for example, corresponding to two separately adjustable angles. Of the light components, R denotes red light, G denotes green light, B denotes blue light, Nav. denotes the light that is used for the navigation system and Com denotes the light that could be used by a communication channel.

In the lower half of the image, denoted as B), is an alternative arrangement for generating and steering an optical beam. Steerable mirror 220 is similar to the steerable mirror in the upper half of FIG. 2. In the B) section, instead of a dispersive element there are dichroic mirrors or beam splitters, denoted collectively as 250. The dichroic mirrors or beam splitters receive light components and emit a single beam 240, which is provided to steerable mirror 220 for directing.

Figure 3:
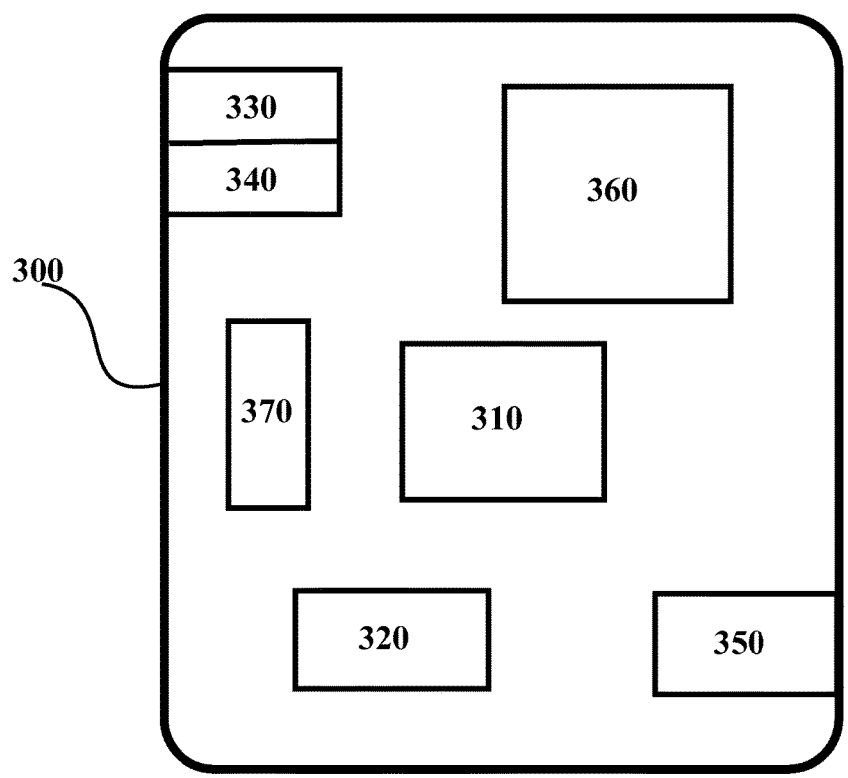
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Brisbane processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a steerable optical beam emitter 350. Steerable optical beam emitter 350 may comprise a steering mechanism, a light source and a photodetector, for example. In some embodiments, a photodetector may be comprised in device 300 outside of steerable optical beam emitter 350. A photodetector may be comprised in a camera, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to navigate in an indoor environment, to accept incoming telephone calls, to originate telephone calls or video calls, to browse the Internet, to manage digital files stored in memory 320 or on a cloud accessible via transmitter 330 and receiver 340.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack user identity module 370.

Processor 310, memory 320, transmitter 330, receiver 340, steerable optical beam emitter 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
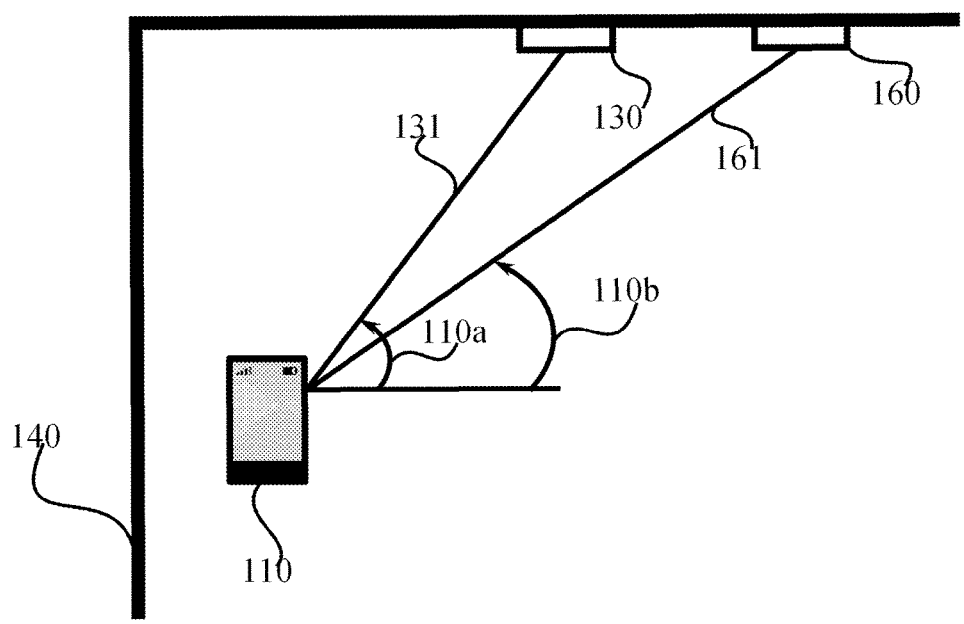
FIG. 4 illustrates an example system capable of supporting at least some embodiments of the present invention.

FIG. 4 illustrates an example system capable of supporting at least some embodiments of the present invention. FIG. 4 resembles some aspects of FIG. 1, and like numbering denotes like structure as in FIG. 1. The system of FIG. 4 comprises a second reference target 160, and device 110 is enabled to determine a direction to second reference target 160 as well as reference target 130. The two angles comprised in the direction to second reference target 160 are denoted in FIG. 4 as 110b, and the beam of light to second reference target 160 as beam 161. Device 110 may be enabled to discover second reference target 160 in a similar way as reference target 130, for example. In some embodiments, the steerable optical beam can be steered at two targets at the same time, for example by steering a red component to reference target 130 and a blue component to second reference target 160. In some embodiments, device 110 can re-steer a single optical beam from reference target 130 to second reference target 160 quickly enough to be able to determine the respective directions to reference target 130 and second reference target 160 at essentially the same time.

From the direction to reference target 130 and the direction to second reference target 160, four angles may be determined, fixing four degrees of freedom. To complete a position estimate, device 110 may fix the two remaining degrees of freedom using data such as that used in the method described in connection with FIG. 1, for example, an orientation of device 110 relative to the vertical fixes two degrees of freedom, and orientation relative to north and the distance to one of the reference targets together fix two degrees of freedom. Distances to reference target 130 and second reference target 160 also collectively fix two degrees of freedom. In some embodiments, a third reference target is present, the direction to the third reference target providing two more angles, usable to fix two degrees of freedom.

In some embodiments, more than six constraints are used to fix the six degrees of freedom, to increase the accuracy of the determined position estimate. For example, where more than one constraint can be used to fix a degree of freedom, an average can be obtained after fixing the degree of freedom separately with both constraints.

Figure 5:
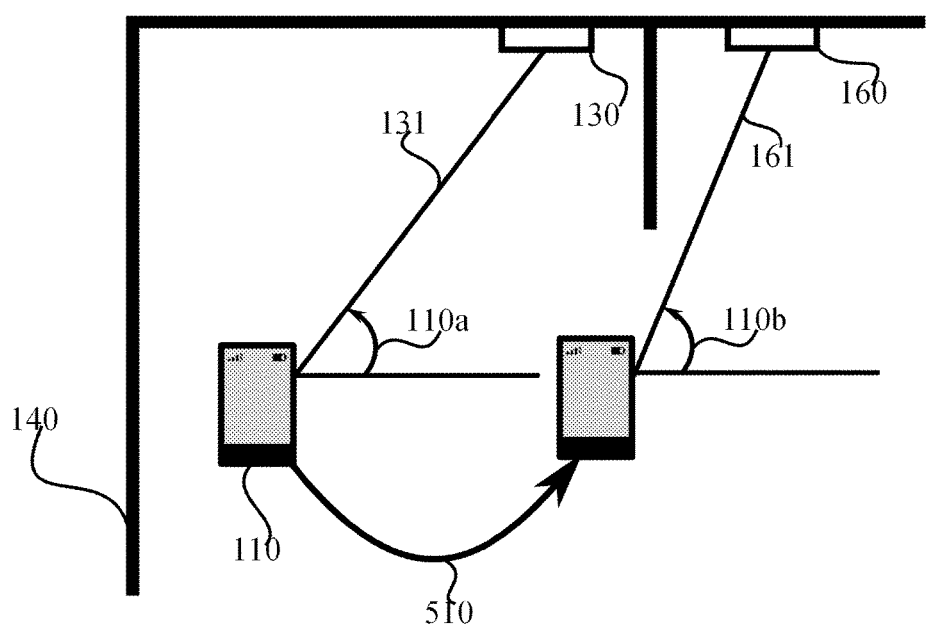
FIG. 5 illustrates an example system capable of supporting at least some embodiments of the present invention.

FIG. 5 illustrates an example system capable of supporting at least some embodiments of the present invention. The system of FIG. 5 resembles that of FIG. 4, and like reference numbers denote like structure. As in FIG. 4, a direction 110a to reference target 130 is determined, at a time instant. At the time instant, second reference target 160 is not visible to device 110. Device 110 stores direction 110a and, optionally, a distance to reference target 130 at the time instant. Subsequently, device 110 keeps track of movement of device 110, for example using an accelerometer and/or at least one gyro comprised in device 110. Movement of device 510 after the time instant is depicted by arrow 510. Device 510 moves to a position where second reference target 160 is visible, enabling determination of direction 110b and, optionally, the distance to second reference target 160. Device 110 may then use direction 110a, direction 110b, the determined distances to reference target 130 and/or second reference target 160 together with the information collected concerning the movement of device 110 after the time instant to fix the six degrees of freedom needed to determine a position estimate. Further information that may be used includes the orientation of device 110 relative to the vertical and/or north. Information concerning movement 510 is usable in enabling using direction 110b together with direction 110a in determining a position estimate for device 110. The position estimate may concern the positing from where second reference target 160 is detected, for example.

Figure 6:
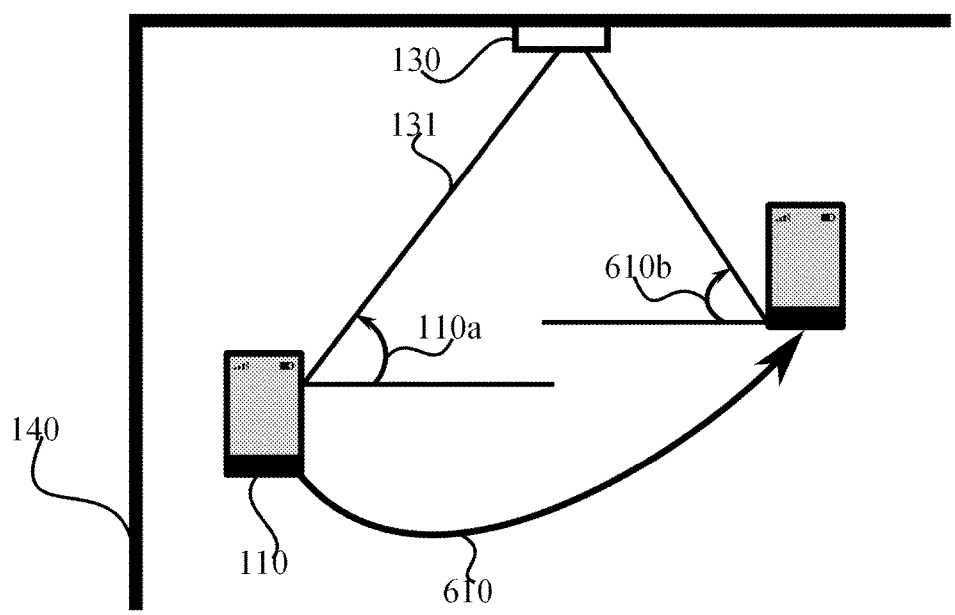
FIG. 6 illustrates an example system capable of supporting at least some embodiments of the present invention.

FIG. 6 illustrates an example system capable of supporting at least some embodiments of the present invention. The system of FIG. 6 resembles that of FIG. 5, except that in FIG. 6 only one reference target 130 is used. In the system of FIG. 6, at a first time instant direction 110a to reference target 130 is determined, after which device 110 keeps track of movement of device 110, for example using an accelerometer and/or at least one gyro comprised in device 110. Such movement is illustrated with arrow 610. At a second time instant, which occurs after the first time instant, a second direction 610b to reference target 130 is determined. Subsequently, device 110 may determine a position estimate using direction 110a, second direction 610b, the information on the movement 610 of device 110 between the first time instant and the second time instant, and optionally further information such as, for example, orientation of device 110 relative to the vertical and/or north. In the system of FIG. 6, like earlier, direction 110a may comprise two angles. Information concerning movement 610 is usable to enable using direction 610b together with direction 110a in determining a position estimate. Likewise, direction 610b may comprise two angles. Therefore, the two directions 110a and 610b together can be used to fix four degrees of freedom for the position estimate.

In some embodiments, device 110 is configured to engage in optical communication with at least one reference target in addition to using the at least one reference target to determine directions and/or distances for position estimate derivation. For example, high-speed optical communication can be performed using the steerable optical beam and photodetector comprised in device 110. For example, quantum key distribution may be performed over an optical link between device 110 and a reference target. For quantum key distribution, an intensity of the optical link may be reduced toward or to a single-photon regime to render eavesdropping more difficult. In these embodiments, reference targets may comprise connection points for an optical communication network, such as for example and indoor optical communication network.

In a general sense, the pointing direction of the optical beam gives partial, but accurate, information about the position of device 110 and this information can be used together with positioning information device 110 has or can obtain about its present location, or by extrapolating from information about its previous location. A triangulated position can also be compared to an internal navigation position and used to decrease error on user position within a building.

In order to save energy, device 110 may be configured to switch the steerable optical beam off responsive to a determination that device 110 is not being used, for example due to device 110 being placed in a pocket or bag. Direction and/or distance determination to reference targets may be performed in bursts to conserve energy.

The steerable optical beam is usable, in some embodiments, for image projection and communication, such as for example quantum communication. Different functionalities of the steerable optical beam may be arranged to take place using a different wavelength, or mix of wavelengths.

Although described above in connection with steerable optical beams, similar principles may be employed using a camera device, where image recognition software may be arranged to identify reference targets, and/or a camera flash function may be used to measure a distance to the reference targets by determining a time of flight. In this case, reference targets may be passive targets or they may comprise light sources.

Figure 7:
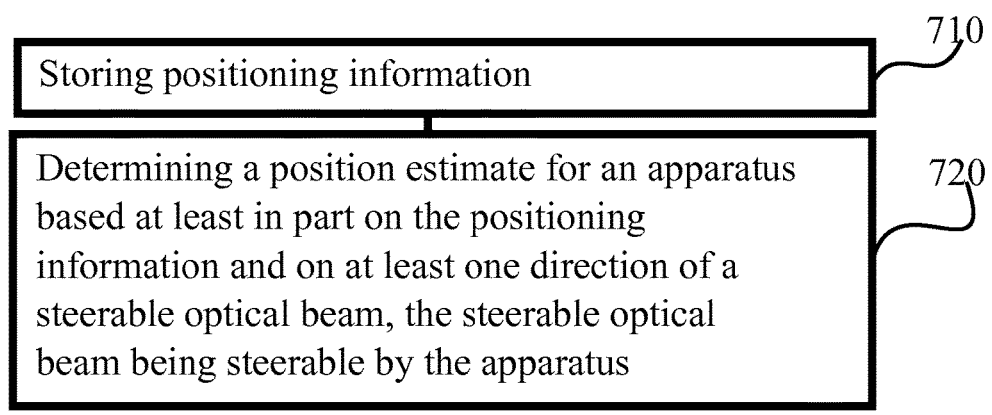
FIG. 7 is a flow chart of a method in accordance with at least some embodiments of the present invention.

FIG. 7 is a flow chart of a method in accordance with at least some embodiments of the present invention. The phases of the illustrated method may be performed in device 110, or a control device configured to control the functioning of device 110, for example.

Phase 710 comprises storing positioning information. Phase 720 comprises determining a position estimate for an apparatus based at least in part on the positioning information and on at least one direction of a steerable optical beam, the steerable optical beam being steerable by the apparatus.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
    at least one memory configured to store positioning information, the positioning information comprising a previously known location of the apparatus,
    at least one steerable optical beam transmitted from the apparatus, wherein the apparatus comprises or is comprised in a cellular device, and
    at least one processing core configured to cause the apparatus to at least:
        steer the at least one transmitted steerable optical beam towards a first reference target to determine, at least in part, a first direction from the apparatus to the first reference target;
        receive, from a base station, a location of the first reference target; and
        determine a position estimate for the apparatus based at least in part on the stored positioning information, the received location of the first reference target, and the determined first direction.

2. The apparatus according to claim 1, wherein the apparatus comprises a steering mechanism arranged to steer the transmitted steerable optical beam.

3. The apparatus according to claim 2, wherein the steering mechanism comprises an adjustable mirror.

4. The apparatus according to claim 1, wherein the transmitted steerable optical beam comprises a steerable laser beam.

5. The apparatus according to claim 1, wherein the at least one processing core is configured to determine the position estimate based on at least one angle indicative of the first direction, a time of flight between the apparatus and the first reference target, and an orientation of the apparatus.

6. The apparatus according to claim 1, wherein the at least one processing core is configured to determine the position estimate based at least in part on the first direction and a second direction of the transmitted steerable optical beam from the apparatus to a second reference target.

7. The apparatus according to claim 1, wherein the at least one processing core is configured to determine the position estimate based at least in part on the first direction, a second direction of the transmitted steerable optical beam from the apparatus to a second reference target and a third direction of the transmitted steerable optical beam from the apparatus to a third reference target.

8. The apparatus according to claim 1, wherein the at least one processing core is configured to determine the position estimate based at least in part on the first direction and a second direction of the transmitted steerable optical beam from the apparatus to a second reference target, the first direction being determined at a time instant when the second direction cannot be determined, and on information concerning movement of the apparatus after the time instant and before determining the second direction.

9. The apparatus according to claim 1, wherein the at least one processing core is configured to determine the position estimate based at least in part on the first direction and a second direction of the transmitted steerable optical beam from the apparatus to the first reference target, the first direction being determined at a first time instant and the second direction at a second time instant, and on information of movement of the apparatus between the first and second time instants.

10. The apparatus according to claim 1, wherein the at least one processing core is configured to use the transmitted steerable optical beam to communicate with the first reference target in a high speed optical communication mode and/or a quantum communication mode.

11. The apparatus according to claim 1, wherein the positioning information is based on a satellite positioning system, motion sensing, sensing of acceleration, radio triangulation and/or measurement of time.

12. A method comprising:
    storing, at an apparatus, positioning information, the positioning information comprising a previously known location of the apparatus, wherein the apparatus comprises or is comprised in a cellular device;

steering, at the apparatus, at least one transmitted steerable optical beam towards a first reference target to determine, at least in part, a first direction from the apparatus to the first reference target;

receiving, at the apparatus and from a base station, a location of the first reference target; and determining, at the apparatus, a position estimate for the apparatus based at least in part on the stored positioning information, the received location of the first reference target, and the determined first direction.

13. The method according to claim 12, further comprising steering the transmitted steerable optical beam by a steering mechanism comprised in the apparatus.

14. The method according to claim 13, wherein the steering mechanism comprises an adjustable mirror.

15. The method according to claim 12, wherein the transmitted steerable optical beam comprises a steerable laser beam.

16. The method according to claim 12, wherein the positioning information is based on a satellite positioning system, motion sensing, sensing of acceleration, radio triangulation and/or measurement of time.

\* \* \* \* \*